(12) United States Patent
Diemer et al.

(10) Patent No.: US 7,470,066 B2
(45) Date of Patent: Dec. 30, 2008

(54) PUMP BEARING ASSEMBLY WITH SEAL

(75) Inventors: John A. Diemer, Farmington Hills, MI (US); Robert E. Rhein, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 343 days.

(21) Appl. No.: 11/386,304

(22) Filed: Mar. 22, 2006

(65) Prior Publication Data
US 2007/0223853 A1 Sep. 27, 2007

(51) Int. Cl.
*F16C 33/76* (2006.01)
*F16C 19/04* (2006.01)

(52) U.S. Cl. .................. 384/477; 384/485; 384/490

(58) Field of Classification Search ........... 384/303, 384/473–477, 479, 481–483, 484–490; 277/346, 277/367, 390, 551, 402–403, 405, 431; 417/423.4, 417/536; 415/90, 174, 231
See application file for complete search history.

(56) References Cited

U.S. PATENT DOCUMENTS

| | | | | |
|---|---|---|---|---|
| 3,393,947 A * | 7/1968 | Sandy Jr. | .................. | 384/303 |
| 3,519,316 A * | 7/1970 | Gothberg | .................. | 384/486 |
| 3,856,368 A * | 12/1974 | Andersen | .................. | 384/485 |
| 3,858,950 A * | 1/1975 | Otto | .................. | 384/485 |
| 4,043,620 A * | 8/1977 | Otto | .................. | 384/485 |
| 4,744,721 A * | 5/1988 | Villeneuve | .................. | 415/113 |
| 4,861,172 A * | 8/1989 | Rudolf et al. | .................. | 384/477 |
| 5,088,840 A * | 2/1992 | Radtke | .................. | 384/535 |
| 5,387,040 A * | 2/1995 | Firestone et al. | .................. | 384/477 |
| 5,927,864 A * | 7/1999 | Feerick | .................. | 384/482 |
| 6,062,734 A * | 5/2000 | Bundgart | .................. | 384/477 |
| 6,149,382 A * | 11/2000 | Englander et al. | .................. | 415/90 |
| 6,241,396 B1 * | 6/2001 | Shimomura et al. | .................. | 384/477 |
| 6,568,180 B2 * | 5/2003 | Maeda et al. | .................. | 60/345 |
| 6,659,228 B2 * | 12/2003 | Wolf et al. | .................. | 384/473 |
| 6,915,886 B2 * | 7/2005 | Dacho et al. | .................. | 192/3.29 |
| 2004/0028305 A1 * | 2/2004 | Akagami et al. | .................. | 384/477 |
| 2004/0109770 A1 * | 6/2004 | Schleicher et al. | .................. | 417/405 |

FOREIGN PATENT DOCUMENTS

| | | | | |
|---|---|---|---|---|
| EP | 1028263 A1 | * | 8/2000 | |
| JP | 2004162744 A | * | 6/2004 | |
| WO | WO 3078841 A1 | * | 9/2003 | |

* cited by examiner

*Primary Examiner*—Marcus Charles

(57) ABSTRACT

The present invention provides a transmission pump bearing assembly having an integral seal. The apparatus preferably includes an outer race retained by a pump body such that the outer race is fixed relative thereto. An inner race is disposed radially within the outer race, and is engaged by a damper hub such that the inner race rotates along with the damper hub. The inner race includes a radially recessed portion adapted to accommodate a seal and maintain tight clearance to control leakage. A plurality of bearing members are disposed radially between the inner race and the outer race. The seal disposed within the radially recessed portion of the inner race is configured to engage the pump body and thereby seal an interface between the inner race and the pump body such that leaked hydraulic fluid is restricted from passing therebetween. A bearing cage is configured to axially retain and/or to maintain circumferential spacing of the plurality of bearing members.

20 Claims, 2 Drawing Sheets

PUMP BEARING ASSEMBLY WITH SEAL

TECHNICAL FIELD

The present invention pertains generally to a transmission pump bearing assembly that includes an integral seal.

BACKGROUND OF THE INVENTION

Conventional transmission pumps are driven by output from the engine in order to transfer hydraulic fluid and thereby meet cooling, lubrication, and pressure requirements of the transmission. The pump includes a pump body which is stationary relative to the transmission housing, and a pump drive gear which is rotatable within the pump body to drive the pump. Rotation from the engine may be transferred to the pump drive gear via a damper hub. A bearing device is commonly disposed between the pump body and the damper hub to radially support the damper hub while allowing the rotation of the damper hub relative to the pump body. As hydraulic fluid may leak from the pump, it is known to provide a separate seal adapted to limit such leakage.

SUMMARY OF THE INVENTION

The transmission pump bearing assembly of the present invention includes an outer race retained by a pump body such that the outer race is fixed relative thereto. An inner race is disposed radially within the outer race, and is engaged by a damper hub such that the inner race rotates along with the damper hub. The inner race includes a radially recessed portion adapted to accommodate a seal. A plurality of bearing members are disposed radially between the inner race and the outer race. The seal disposed within the radially recessed portion of the inner race is configured to engage the pump body and thereby seal an interface between the inner race and the pump body such that leaked hydraulic fluid is restricted from passing therebetween. A bearing cage is configured to axially retain the plurality of bearing members.

The inner race may include a stepped portion configured to axially retain the seal.

The plurality of bearing members may be ball bearings, and the seal may be composed of polyetheretherketone (PEEK).

The outer race may be press fit into engagement with the pump body, or may be secured to the pump body with a snap ring.

The inner race may be dimensioned to tightly engage the damper hub such that leakage therebetween is restricted.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
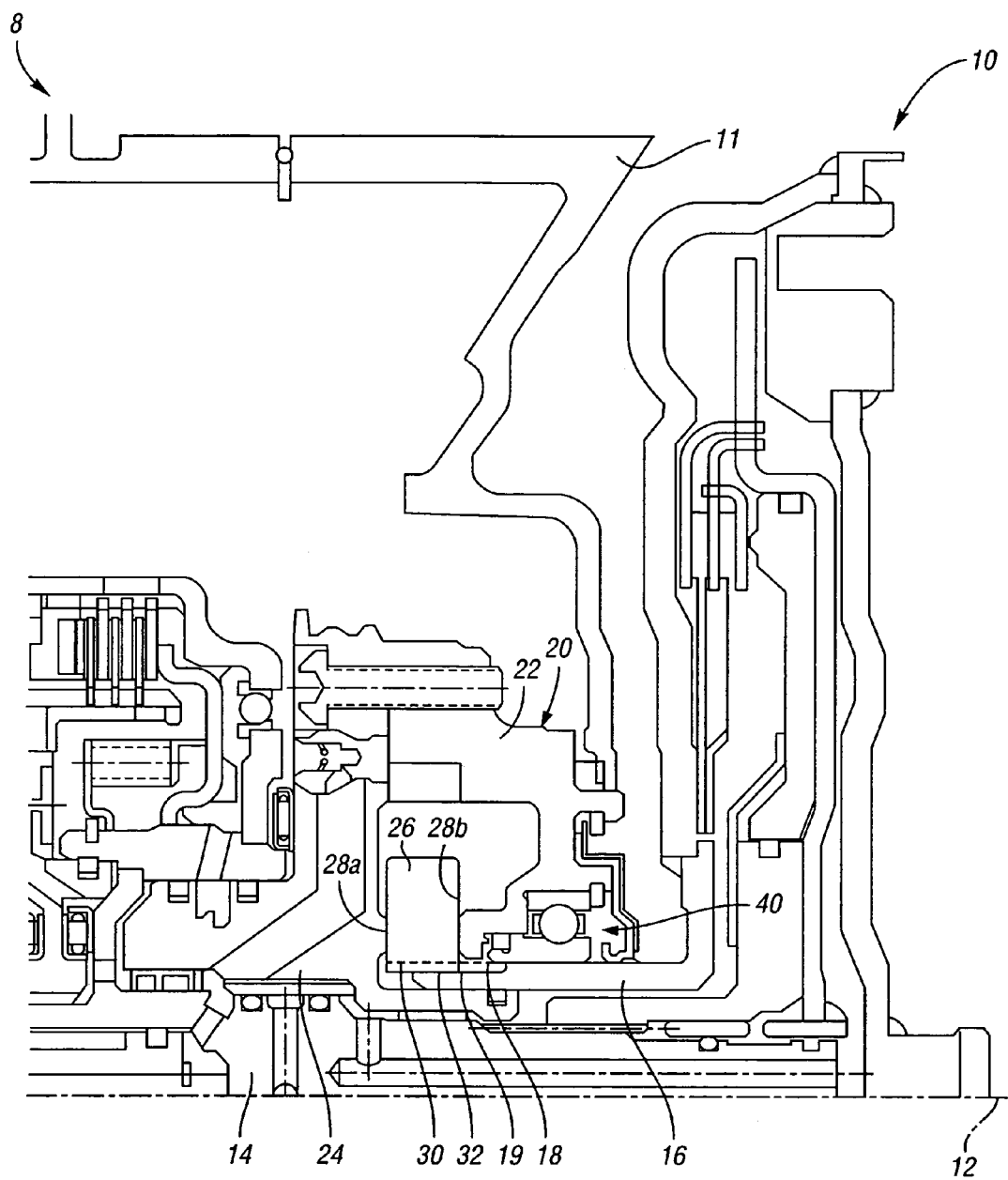
FIG. 1 is a partial cross-sectional view of a transmission including the bearing assembly of the present invention.

Referring to the drawings, wherein like reference numbers refer to like components, FIG. 1 shows a partial cross-sectional view of a transmission 8 in accordance with the present invention. According to the preferred embodiment shown, the transmission 8 is operatively connected to a damper assembly 10; however alternate embodiments may replace the damper assembly 10 with a torque converter (not shown). For illustrative purposes, only the top half of the transmission 8 and the damper assembly 10 are shown. It should be appreciated, however, that the transmission 8 and damper assembly 10 are generally symmetrical about the center line 12 of the transmission input shaft 14.

The damper assembly 10 includes a generally cylindrical damper hub 16. The damper hub 16 includes a generally annular end portion 18 shown in dashed lines that includes a flat section 19 adapted to engage and thereby drive a pump drive gear 26 as will be described in detail hereinafter. The damper assembly 10 is operatively connected to an engine (not shown) such that the damper hub 16 rotates about the center line 12 at engine speed.

The transmission 8 includes a pump 20 configured to transfer hydraulic fluid to meet any cooling, lubrication, and pressure requirements of the transmission 8. The pump 20 includes a pump body 22, a pump cover 24 and a generally annular pump drive gear 26. The pump body 22 and pump cover 24 are stationary relative to the transmission housing 11, and the drive gear 26 is rotatable relative to the transmission housing 11. Rotation of the drive gear 26 power the pump 20 to transfer hydraulic fluid. The pump drive gear 26 defines opposing side portions 28a, 28b, and a radially inner surface 30 shown in dashed lines. The radially inner surface 30 of the pump drive gear 26 includes a generally flat engagement portion 32. The engagement portion 32 of the drive gear 26 is engaged by the flat section 19 of the damper hub 16 such that the rotation of the damper hub 16 is imparted to the drive gear 26 thereby powering the pump 20. While the drive gear 26 is preferably mechanically coupled to the damper hub 16 via the geometry of the flat engagement portion 32 and the flat section 19, other conventional coupling geometries such as, for example, a splined interface may be envisioned.

Figure 2:
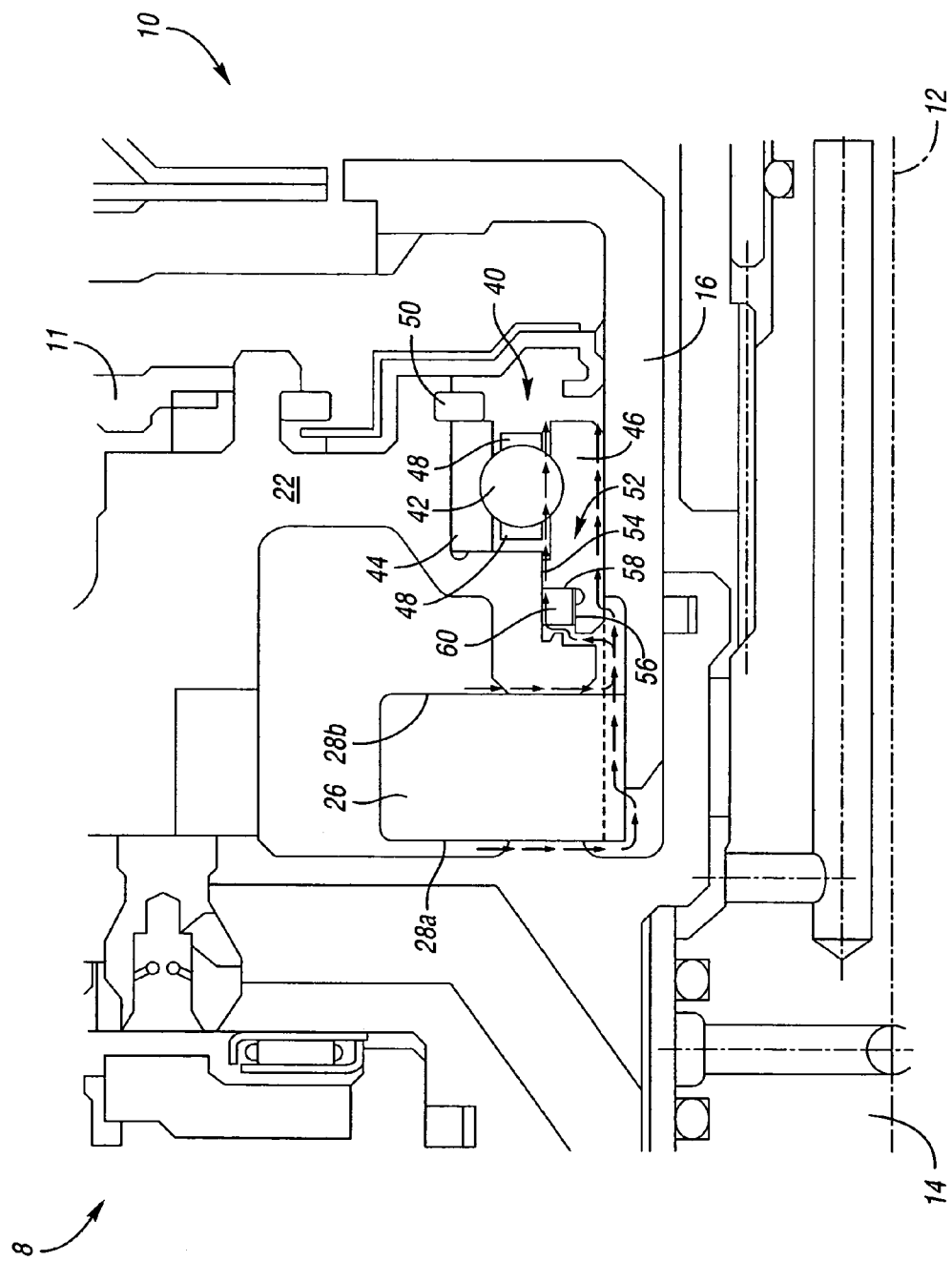
FIG. 2 is a more detailed cross-sectional view of the bearing assembly of FIG. 1.

The transmission 8 includes a bearing device 40 configured to radially support the damper hub 16 on the pump body 22 such that the damper hub 16 is rotatable relative to the stationary pump body 22. Referring to FIG. 2, the bearing device 40 is shown in more detail. The bearing device 40 is preferably a ball bearing device, however, alternate bearing device configurations may be envisioned.

The bearing device 40 includes a plurality of bearing members such as the ball bearings 42. The ball bearings 42 are radially retained between an outer race 44 and an inner race 46. The ball bearings 42 are axially retained and/or circumferential spacing is maintained by a bearing cage 48. The outer race 44 may be press fit into a recessed portion of the pump body 22 and/or may be retained in the pump body 22 with a snap ring 50 such that the outer race 44 is fixed relative to the stationary pump body 22. The inner race 46 is engaged by the damper hub 16 and rotates therewith.

The inner race 46 includes an annular protrusion 52 extending in an axial direction toward the pump drive gear 26. The annular protrusion 52 preferably includes a dual-step design having a first step 54 extending radially outward from the annular protrusion 52, and a second step or radially recessed portion 56 extending radially inward from the first step. A shoulder portion 58 is defined between the first and second steps 54, 56. The first step 54 is configured to approach the pump body 22 such that the first step 54 is in close proximity to but does not touch the pump body 22. The first step 54 and the shoulder portion 58 are configured to axially retain a seal 60, and the second step 56 is configured to radially retain the seal 60. The seal 60 engages the pump body 22 to provide a sealing function as will be described in detail hereinafter. According to a preferred embodiment, the seal 60 is a high pressure rotating split ring seal composed of a resin such as polyetheretherketone (PEEK), however alternate seal configurations and/or compositions may be envisioned.

It has been observed that hydraulic fluid from the pump 20 can leak along the opposing side portions 28a, 28b of the pump drive gear 26, between the pump body 22 or the drive gear 26 and the damper hub 16, and into the bearing device 40 as shown with arrows representing leaked hydraulic fluid. This leakage is prevented or limited by the engagement of the seal 60 with the pump body 22. By providing a bearing device 40 with an integral seal 60, the apparatus is more axially compact as compared to separate bearing and seal components. Additionally, the installation of the single bearing device 40 is both easier and faster than the corresponding assembly of a separate bearing and seal.

It is also possible for leaked hydraulic fluid to escape between the inner race 46 and the damper hub 16. This potential leakage is prevented or limited by providing a tight clearance fit between the inner race 46 and the damper hub 16. A tighter seal is obtainable by incorporating a labyrinth seal or O-ring seal (not shown) at the interface between the inner race 46 and the damper hub 16.

The axial variation of the inner race 46 is preferably tightly controlled, and the inner race 46 is axially positioned in close proximity to the pump body 22 to provide an axially compact design as compared to other designs, particularly those incorporating separate bearing and sealing members. Additionally, as is known in the art, pressure in the damper assembly 10 can translate the damper hub 16 in an axial direction relative to the inner race 46. With conventional designs wherein a seal comes into contact with the damper hub, the seal must be positioned at an axial position configured to ensure the flat section of the damper hub never engages the seal. As the seal 60 of the present invention is supported by the inner race 46, the seal 60 is not affected by the flat section 19 thereby eliminating concerns associated with the axial position of the flat section 19 and allowing more flexibility in the axial position of the inner race 46 such that packaging of the bearing device 40 is simplified.

While the best modes for carrying out the invention have been described in detail, those familiar with the art to which this invention relates will recognize various alternative designs and embodiments for practicing the invention within the scope of the appended claims.

The invention claimed is:

1. A transmission bearing device comprising:
   an outer race secured to a non-rotatable element;
   an inner race disposed radially within the outer race, said inner race engaged by a rotatable element such that the inner race rotates along with the rotatable element, said inner race defining a radially recessed portion;
   a plurality of bearing members disposed radially between the inner race and the outer race; and
   a seal retained within the radially recessed portion of the inner race and fixed relative to said inner race, said seal configured to sealingly engage the non-rotatable element and thereby seal an interface between the inner race and the non-rotatable element such that leaked hydraulic fluid is restricted from passing therebetween.

2. The transmission bearing device of claim 1, further comprising a bearing cage disposed axially around the plurality of bearing members such that the plurality of bearing members are axially retained and circumferential spacing of the bearing members is maintained.

3. The transmission bearing device of claim 1, wherein the inner race includes a stepped portion extending in a radially outward direction, said stepped portion configured to axially retain the seal.

4. The transmission bearing device of claim 1, wherein the plurality of bearing members are ball bearings.

5. The transmission bearing device of claim 1, wherein the seal is composed of polyetheretherketone.

6. The transmission bearing device of claim 1, wherein the outer race is press fit into engagement with the non-rotatable element.

7. The transmission bearing device of claim 1, wherein the outer race is secured to the non-rotatable element with a snap ring.

8. The transmission bearing device of claim 1, wherein said inner race is dimensioned to tightly engage the rotatable element such that leakage therebetween is restricted.

9. A transmission pump bearing device comprising:
   an outer race secured to a pump body such that the outer race is fixed relative to the pump body;
   an inner race disposed radially within the outer race, said inner race engaged by a damper hub such that the inner race rotates along with the damper hub, said inner race including a radially recessed portion;
   a plurality of bearing members disposed radially between the inner race and the outer race;
   a seal retained within the radially recessed portion of the inner race and fixed relative to said inner race, said seal configured to sealingly engage the pump body and thereby seal an interface between the inner race and the pump body such that leaked hydraulic fluid is restricted from passing therebetween; and
   a bearing cage disposed axially about the plurality of bearing members, said bearing cage configured to maintain circumferential spacing of the plurality of bearing members.

10. The transmission pump bearing device of claim 9, wherein the inner race includes a stepped portion extending in a radially outward direction, said stepped portion configured to axially retain the seal.

11. The transmission pump bearing device of claim 10, wherein the plurality of bearing members are ball bearings.

12. The transmission pump bearing device of claim 11, wherein the seal is composed of polyetheretherketone.

13. The transmission pump bearing device of claim 12, wherein the outer race is press fit into engagement with the pump body.

14. The transmission pump bearing device of claim 12, wherein the outer race is secured to the pump body with a snap ring.

15. The transmission pump bearing device of claim 12, wherein said inner race is dimensioned to tightly engage the damper hub such that leakage therebetween is restricted.

16. A transmission pump bearing device comprising:
   an outer race secured to a pump body such that the outer race is fixed relative to the pump body;
   an inner race disposed radially within the outer race, said inner race engaged by a damper hub such that the inner race rotates along with the damper hub, said inner race including:
      an annular protrusion extending in an axial direction;
      a first step extending radially outward from the annular protrusion, said first step being in close proximity to the pump body; and
      a second step extending radially inward from the first step;
   a plurality of ball bearings disposed radially between the inner race and the outer race;
   a seal secured onto the first step of the inner race, said seal configured to engage the pump body and thereby seal an interface between the inner race and the pump body such that leaked hydraulic fluid is restricted from passing therebetween; and
   a bearing cage disposed axially about the plurality of ball bearings, said bearing cage configured to maintain circumferential spacing of the plurality of ball bearings.

17. The transmission pump bearing device of claim 16, wherein the seal is composed of polyetheretherketone.

18. The transmission pump bearing device of claim 17, wherein the outer race is press fit into engagement with the pump body.

19. The transmission pump bearing device of claim 17, wherein the outer race is secured to the pump body with a snap ring.

20. The transmission pump bearing device of claim 17, wherein said inner race is dimensioned to tightly engage the damper hub such that leakage therebetween is restricted.

* * * * *